US011296861B1

(12) United States Patent
Zhang et al.

(10) Patent No.: US 11,296,861 B1
(45) Date of Patent: Apr. 5, 2022

(54) PAILLIER DECRYPTION SYSTEM, IC AND METHOD

(71) Applicant: Clustar Technology Co., Ltd., Guangdong (CN)

(72) Inventors: Long Zhang, Guangdong (CN); Wei Wang, Guangdong (CN); Shuihai Hu, Guangdong (CN)

(73) Assignee: CLUSTAR TECHNOLOGY CO., LTD., Guangdon (CN)

( * ) Notice: Subject to any disclaimer, the term of this patent is extended or adjusted under 35 U.S.C. 154(b) by 0 days.

(21) Appl. No.: 17/514,752

(22) Filed: Oct. 29, 2021

(30) Foreign Application Priority Data

Apr. 21, 2021 (CN) .......................... 202110429766.1

(51) Int. Cl.
*H04L 9/00* (2022.01)
*H04L 9/30* (2006.01)

(52) U.S. Cl.
CPC ............ *H04L 9/008* (2013.01); *H04L 9/3033* (2013.01)

(58) Field of Classification Search
CPC .............................. H04L 9/008; H04L 9/3033
See application file for complete search history.

(56) References Cited

U.S. PATENT DOCUMENTS

| 8,515,058 | B1* | 8/2013 | Gentry | H04L 9/008 380/28 |
| 9,641,332 | B1* | 5/2017 | Yung | H04L 9/30 |
| 10,333,696 | B2* | 6/2019 | Ahmed | H04L 9/006 |
| 11,222,131 | B2* | 1/2022 | Oberhofer | H04L 9/006 |
| 2012/0213359 | A1* | 8/2012 | Troncoso Pastoriza | H04L 9/008 380/28 |
| 2015/0193628 | A1* | 7/2015 | Maniatakos | G06F 21/602 713/164 |
| 2015/0295710 | A1* | 10/2015 | Joye | H04L 9/008 380/30 |
| 2015/0312031 | A1* | 10/2015 | Seo | H04L 9/008 380/28 |
| 2017/0310643 | A1* | 10/2017 | Hardy | G06F 21/6254 |
| 2018/0249504 | A1* | 8/2018 | Grissa | H04W 12/03 |
| 2019/0036678 | A1* | 1/2019 | Ahmed | H04L 9/302 |
| 2019/0372763 | A1* | 12/2019 | Yang | H04L 9/0847 |

(Continued)

FOREIGN PATENT DOCUMENTS

| CN | 109068322 | 12/2018 |
| CN | 111832050 | 10/2020 |

*Primary Examiner* — Gary S Gracia
(74) *Attorney, Agent, or Firm* — Rankin, Hill & Clark LLP

(57) ABSTRACT

A Paillier decryption system, IC, and method. The IC includes: a modular exponentiation module, for performing modular exponentiation operations related to a first subitem and a second subitem, where a Paillier decryption process of encrypted data is divided into a first subitem and a second subitem according to the Chinese remainder theorem, the first subitem corresponding to a first prime, the second subitem corresponding to a second prime, a public key of the encrypted data being a product of the first prime and the second prime, a bit width of the first prime being the same as a bit width of the second prime; a first module combination corresponding to the first subitem, for determining a computation result of the first subitem; and a second module combination corresponding to the second subitem, for determining a computation result of the second subitem.

20 Claims, 4 Drawing Sheets

(56) References Cited

U.S. PATENT DOCUMENTS

2019/0386814 A1* 12/2019 Ahmed ................. H04L 9/3013
2021/0211269 A1*  7/2021 Wade .................... H04L 9/3006

* cited by examiner

PAILLIER DECRYPTION SYSTEM, IC AND METHOD

CROSS-REFERENCE TO RELATED APPLICATIONS

The present application claims priority to allowed Chinese patent application Ser. No. CN202110429766.1, filed on Apr. 21, 2021, which has issued as CN112988237B on Jul. 23, 2021, the contents of which are incorporated by reference in their entirety.

BACKGROUND

With the development of application fields such as artificial intelligence and big data mining and analysis, the demand for data volume is increasing. For example, training an application model of artificial intelligence requires the use of a large amount of training data with appropriate data labels or feature values. High-quality data often comes from application data generated and accumulated in business activities. However, application data is often scattered in the hands of different organizations and individuals. For example, transaction data is scattered in various financial institutions, and medical diagnosis data is scattered in various medical institutions. Cross-industry and cross-domain application data is often scattered, for example, social attribute data and e-commerce transaction data in the Internet domain are often controlled by different entities. As the importance of data ownership, user privacy, and data security have received more attention, and laws and regulations have imposed stricter constraints and requirements on data collection and processing, organizations or individuals that hold application data are often unwilling to or have no suitable means to cooperate with each other, making it difficult for the application data they hold work together. This dilemma in data sharing and collaboration is called the isolated data island phenomenon. In order to solve the problems of cross-industry and cross-organization data cooperation, especially the critical privacy protection and data security issues, the concept of federated learning is proposed. Federated learning refers to the fact that each participant who owns the data exchanges model-related information through encryption on the premise that they do not share the protected private data and their own data are not to be exposed to outside, so as to achieve collaborative optimization of the federated learning model. Based on the distribution of the data feature space and sample space of the training data among different participants, federated learning may be classed into horizontal federated learning with large overlap in the data feature space and small overlap in the sample space, vertical federated learning with small overlap in the data feature space and large overlap in the sample space, and federated transfer learning with small overlap in both the data feature space and the sample space.

In implementation scenarios related to federated learning, all parties holding data protect data security and user privacy through privacy protection technologies, such as using the homomorphic encryption method to encrypt the original data, also called unencrypted data, then using the data in encrypted state also called encrypted data for model training, gradient calculation, parameter calculation, etc. The homomorphic encryption method allows effective operations such as addition and multiplication to be performed directly on encrypted data, and the result of direct calculation on encrypted data is equivalent to the result of calculation on unencrypted data after decryption, and therefore one may rely on public key and encrypted data only to calculate and without knowing the secret key. A common method of homomorphic encryption is Paillier algorithm. Paillier algorithm satisfies additive homomorphism and multiplication homomorphism, and has high security in data encryption and privacy protection and has been widely used. However, Paillier algorithm involves modular exponentiation operations, modular multiplication operations, and division operations with large integer bit widths, and the data bit width can be 1024 bits, 2048 bits, 4096 bits or more. While, existing central processing unit (CPU) which are based on instructions architecture and graphics processing unit (GPU) fail to meet the needs of Paillier algorithm well. Accordingly, a Paillier decryption system, IC, and method are needed, which can cope with various arithmetic operations involving large integer bit widths invoked by the Paillier algorithm and have good computation performance and lower energy consumption.

SUMMARY

The present disclosure relates to the technical fields of data security and privacy protection, and specifically relates to a Paillier decryption system, IC, and method.

The present disclosure provides a Paillier decryption system, IC, and method, in order to solve the technical problem of how to cope with various arithmetic operations involving large integer bit widths invoked by the Paillier algorithm while having good computation performance and lower energy consumption, and has achieved beneficial technical improvements such as a significant reduction in the bit width of operations, which is conducive to improving the speed of complex operations with large integer bit widths.

In accordance with a first aspect of the present disclosure, the embodiments of the present disclosure provide a Paillier decryption system. The system includes: a modular exponentiation module, configured for performing modular exponentiation operations related to a first subitem to output a modular exponentiation result of the first subitem and for performing modular exponentiation operations related to a second subitem to output a modular exponentiation result of the second subitem, specifically, a Paillier decryption process of encrypted data is divided into a first subitem and a second subitem according to the Chinese remainder theorem, the first subitem corresponds to a first prime, the second subitem corresponds to a second prime, a public key of the encrypted data is a product of the first prime and the second prime, a bit width of the first prime is the same as a bit width of the second prime; a first subtraction module for performing subtraction operation by subtracting one on the modular exponentiation result of the first subitem to output a subtraction result of the first subitem; a first division module for performing division operation using the first prime as the divisor on the subtraction result of the first subitem to output a division result of the first subitem; a first modular multiplication module for performing modular multiplication operations on the division result of the first subitem to output a computation result of the first subitem; a second subtraction module for performing subtraction operation by subtracting one on the modular exponentiation result of the second subitem to output a subtraction result of the second subitem; a second division module for performing division operation using the second prime as the divisor on the subtraction result of the second subitem to output a division result of the second subitem; and a second modular multiplication module for performing modular multiplication operations on the division result of the second subitem to output a computation result of the second subitem. The first modular multiplication module uses the first prime as the modulo for performing modular multiplication operations, the second modular multiplication module uses the second prime as the modulo for performing modular multiplication operations, the computation result of the first subitem and the computation result of the second subitem are used to determine unencrypted data corresponding to the encrypted data.

With reference to the first aspect of the present disclosure, the computation process of Paillier decryption of encrypted data is divided into the first subitem corresponding to the first prime and the second subitem corresponding to the second prime, and the public key of encrypted data is the product of the first prime and the second prime, thereby greatly reducing the operational bit width. It is beneficial to improve the speed of complex computations with large integer bit widths, and to improve the overall computation speed by processing the first subitem and second subitem in parallel.

In accordance with the first aspect of the present disclosure, in a manner of implementation, the modulo of modular exponentiation operations related to the first subitem is the second power of the first prime, and the modulo of modular exponentiation operations related to the second subitem is the second power of the second prime. Therefore, it is beneficial for greatly reducing the operational bit width and improving the speed of complex computations with large integer bit widths.

In accordance with the first aspect of the present disclosure, in a manner of implementation, the system also includes a parameter calculation module, configured for calculating the first prime and the second prime according to a public key of the encrypted data, calculating intermediate parameters of the first subitem and intermediate parameters of the second subitem respectively according to the first prime and the second prime, sending the intermediate parameters of the first subitem to the first modular multiplication module, and sending the intermediate parameters of the second subitem to the second modular multiplication module. Therefore, by using the parameter calculation module to calculate relevant parameters for each encrypted data and sends each parameter to corresponding module, thereby saving resources and time for repeated calculation of parameters. It is beneficial to improve the overall calculation speed and save power consumption.

In accordance with the first aspect of the present disclosure, in a manner of implementation, the first modular multiplication module performs modular multiplication operations according to the division result of the first subitem and the intermediate parameters of the first subitem, and the second modular multiplication module performs modular multiplication operations according to the division result of the second subitem and the intermediate parameters of the second subitem. Therefore, it is beneficial for saving resources and time for repetitive calculation of parameters, and improving the overall calculation speed and saving power consumption.

In accordance with the first aspect of the present disclosure, in a manner of implementation, the modular exponentiation module includes a plurality of parallel modular exponentiation engines. The modular exponentiation module is configured for performing modular exponentiation operations related to the first subitem to output the modular exponentiation result of the first subitem and for performing modular exponentiation operations related to the second subitem to output the modular exponentiation result of the second subitem, and includes: a first part of the plurality of parallel modular exponentiation engines is used to implement modular exponentiation operations related to the first subitem to output the modular exponentiation result of the first subitem; a second part of the plurality of parallel modular exponentiation engines is used to implement modular exponentiation operations related to the second subitem to output the modular exponentiation result of the second subitem; a ratio of the number of modular exponentiation engines of the first part with respect to the number of modular exponentiation engines of the second part is determined according to a ratio of the first prime with respect to the second prime. Therefore, the modular exponentiation operations of the first subitem is processed through a part of the modular exponentiation module, and the modular exponentiation operations of the second subitem is processed in parallel through another part of the modular exponentiation module, so that the modular exponentiation operations of the first subitem and the modular exponentiation operations of the second subitem are processed in parallel. thereby increasing the overall computational speed.

In accordance with the first aspect of the present disclosure, in a manner of implementation, the system also includes: a modular subtraction module for performing modular multiplication operations on a subtraction result to obtain a modular subtraction result, the subtraction result is the difference of the computation result of the first subitem minus the computation result of the second subitem. Therefore, the computation process of the first subitem and the second subitem are merged into the modular subtraction module.

In accordance with the first aspect of the present disclosure, in a manner of implementation, the modular subtraction module for performing modular multiplication operations on the subtraction result to obtain the modular subtraction result, includes: when the subtraction result is greater than zero but less than the first prime, the modular subtraction result is the subtraction result; when the subtraction result is less than zero and a sum of the subtraction result plus the first prime is greater than zero, the modular subtraction result is the sum of the subtraction result plus the first prime; when the subtraction result is less than zero and the sum of the subtraction result plus the first prime is less than zero, the modular subtraction result is the sum of the subtraction result plus twice of the first prime. Therefore, the modular subtraction module can avoid the possibility of negative numbers in the result of the computation result of the first subitem minus the computation result of the second subitem, so that the modular subtraction module can deal with any way of dividing the first subitem and the second subitem. It is beneficial to improve the flow processing speed and system adaptability.

In accordance with the first aspect of the present disclosure, in a manner of implementation, the system also includes a third modular multiplication module for performing modular multiplication operations based on the modular subtraction result and a modular inversion result of the second prime. Therefore, the subsequent computation process is realized.

In accordance with a second aspect of the present disclosure, the embodiments of the present disclosure provide an integrated circuit (IC), applicable to Paillier decrypting. The IC includes: a modular exponentiation module, configured for performing modular exponentiation operations related to a first subitem to output a modular exponentiation result of the first subitem and for performing modular exponentiation operations related to a second subitem to output a modular exponentiation result of the second subitem, specifically, a Paillier decryption process of encrypted data is divided into a first subitem and a second subitem according to the Chinese remainder theorem, the first subitem corresponds to a first prime, the second subitem corresponds to a second prime, a public key of the encrypted data is a product of the first prime and the second prime, a bit width of the first prime is the same as a bit width of the second prime; a first module combination corresponding to the first subitem, the first module combination is configured for determining a computation result of the first subitem according to the modular exponentiation result of the first subitem; and a second module combination corresponding to the second subitem, the second module combination is configured for determining a computation result of the second subitem according to the modular exponentiation result of the second subitem. The computation result of the first subitem and the computation result of the second subitem are used to determine unencrypted data corresponding to the encrypted data. The first module combination is configured for determining the computation result of the first subitem according to the modular exponentiation result of the first subitem, and includes: by way of the first module combination, performing subtraction operation by subtracting one on the modular exponentiation result of the first subitem to obtain a subtraction result of the first subitem, performing division operation using the first prime as the divisor on the subtraction result of the first subitem to obtain a division result of the first subitem, and performing modular multiplication operations on the division result of the first subitem to obtain the computation result of the first subitem. The second module combination is configured for determining the computation result of the second subitem according to the modular exponentiation result of the second subitem, and includes: by way of the second module combination, performing subtraction operation by subtracting one on the modular exponentiation result of the second subitem to obtain a subtraction result of the second subitem, performing division operation using the second prime as the divisor on the subtraction result of the second subitem to obtain a division result of the second subitem, and performing modular multiplication operations on the division result of the second subitem to obtain the computation result of the second subitem.

With reference to the second aspect of the present disclosure, the computation process of Paillier decryption of encrypted data is divided into the first subitem corresponding to the first prime and the second subitem corresponding to the second prime, and the public key of encrypted data is the product of the first prime and the second prime, thereby greatly reducing the operational bit width. It is beneficial to improve the speed of complex computations with large integer bit widths, and to improve the overall computation speed by processing the first subitem and second subitem in parallel.

In accordance with a third aspect of the present disclosure, the embodiments of the present disclosure provide a method for Paillier decrypting, and the method includes: dividing a Paillier decryption process of encrypted data into a first subitem and a second subitem according to the Chinese remainder theorem, specifically, the first subitem corresponds to a first prime, the second subitem corresponds to a second prime, a public key of the encrypted data is a product of the first prime and the second prime; performing modular exponentiation operations related to the first subitem, by a plurality of parallel first modular exponentiation engines, and outputting a modular exponentiation result of the first subitem; performing modular exponentiation operations related to the second subitem, by a plurality of parallel second modular exponentiation engines, and outputting a modular exponentiation result of the second subitem; by a first module combination corresponding to the first subitem, determining a computation result of the first subitem according to the modular exponentiation result of the first subitem; by a second module combination corresponding to the second subitem, determining a computation result of the second subitem according to the modular exponentiation result of the second subitem; and based on the computation result of the first subitem and the computation result of the second subitem, determining unencrypted data corresponding to the encrypted data. Determining the computation result of the first subitem according to the modular exponentiation result of the first subitem, includes: performing subtraction operation by subtracting one on the modular exponentiation result of the first subitem to obtain a subtraction result of the first subitem, performing division operation using the first prime as the divisor on the subtraction result of the first subitem to obtain a division result of the first subitem, and performing modular multiplication operations on the division result of the first subitem to obtain the computation result of the first subitem. Determining the computation result of the second subitem according to the modular exponentiation result of the second subitem, includes: performing subtraction operation by subtracting one on the modular exponentiation result of the second subitem to obtain a subtraction result of the second subitem, performing division operation using the second prime as the divisor on the subtraction result of the second subitem to obtain a division result of the second subitem, and performing modular multiplication operations on the division result of the second subitem to obtain the computation result of the second subitem.

With reference to the third aspect of the present disclosure, the computation process of Paillier decryption of encrypted data is divided into the first subitem corresponding to the first prime and the second subitem corresponding to the second prime, and the public key of encrypted data is the product of the first prime and the second prime, thereby greatly reducing the operational bit width. It is beneficial to improve the speed of complex computations with large integer bit widths, and to improve the overall computation speed by processing the first subitem and second subitem in parallel.

BRIEF DESCRIPTION OF THE DRAWINGS

The drawings are provided to illustrate example embodiments described herein and are not intended to limit the scope of the present disclosure.

DETAILED DESCRIPTION

Figure 1:
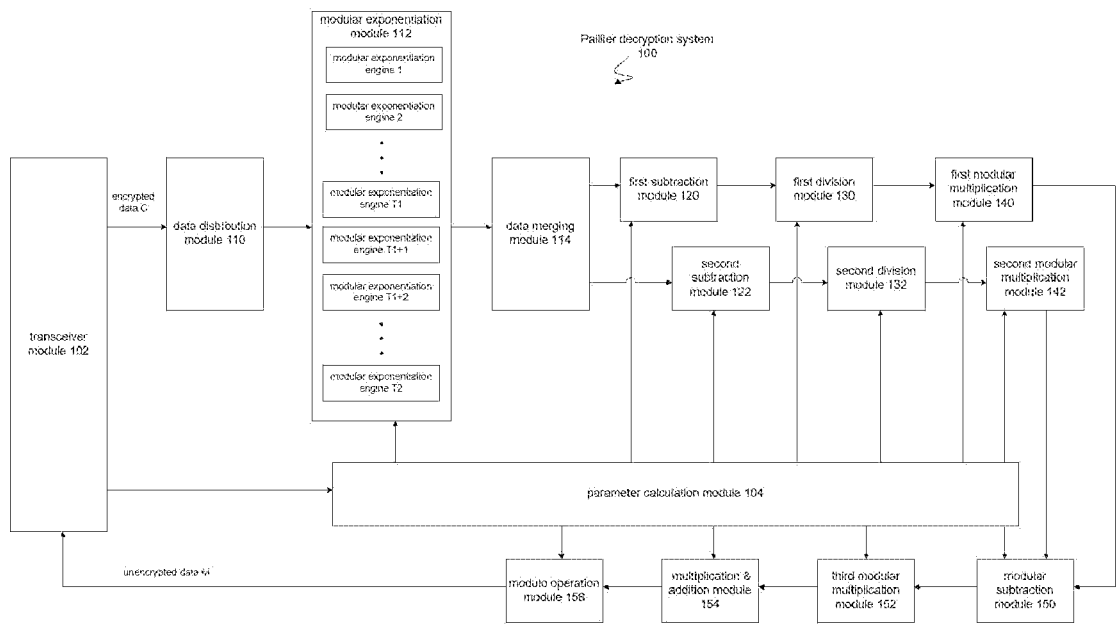
FIG. 1 is a block diagram illustrating a Paillier decryption system in accordance with the present disclosure.

The present disclosure, in order to solve the technical problem of how to cope with various arithmetic operations involving large integer bit widths invoked by the Paillier algorithm while having good computation performance and lower energy consumption, provides a Paillier decryption system, IC, and method. The system includes: a modular exponentiation module, configured for performing modular exponentiation operations related to a first subitem to output a modular exponentiation result of the first subitem and for performing modular exponentiation operations related to a second subitem to output a modular exponentiation result of the second subitem, specifically, a Paillier decryption process of encrypted data is divided into a first subitem and a second subitem according to the Chinese remainder theorem, the first subitem corresponds to a first prime, the second subitem corresponds to a second prime, a public key of the encrypted data is a product of the first prime and the second prime, a bit width of the first prime is the same as a bit width of the second prime; a first subtraction module for performing subtraction operation by subtracting one on the modular exponentiation result of the first subitem to output a subtraction result of the first subitem; a first division module for performing division operation using the first prime as the divisor on the subtraction result of the first subitem to output a division result of the first subitem; a first modular multiplication module for performing modular multiplication operations on the division result of the first subitem to output a computation result of the first subitem; a second subtraction module for performing subtraction operation by subtracting one on the modular exponentiation result of the second subitem to output a subtraction result of the second subitem; a second division module for performing division operation using the second prime as the divisor on the subtraction result of the second subitem to output a division result of the second subitem; and a second modular multiplication module for performing modular multiplication operations on the division result of the second subitem to output a computation result of the second subitem. The first modular multiplication module uses the first prime as the modulo for performing modular multiplication operations, the second modular multiplication module uses the second prime as the modulo for performing modular multiplication operations, the computation result of the first subitem and the computation result of the second subitem are used to determine unencrypted data corresponding to the encrypted data. Therefore, the computation process of Paillier decryption of encrypted data is divided into the first subitem corresponding to the first prime and the second subitem corresponding to the second prime, and the public key of encrypted data is the product of the first prime and the second prime, thereby greatly reducing the operational bit width. It is beneficial to improve the speed of complex computations with large integer bit widths, and to improve the overall computation speed by processing the first subitem and second subitem in parallel.

Embodiments of the present disclosure may be applicable to following implementation scenarios, including but limited to: encryption and decryption system based on Paillier algorithm, software layer operation, secure multi-party computation, framework or algorithm for privacy-preserving computation, machine learning model training related to federated learning, and any other scenarios that might need to use Paillier algorithm or any homomorphic encryption algorithm equivalent to Paillier algorithm.

The embodiments of the present disclosure can be adjusted and improved according to specific implementation scenarios or application environments, and are not specifically limited here.

In order for those skilled in the art better understanding the present disclosure, the embodiments of the present disclosure will be described below with reference to the drawings of the present disclosure.

Referring to FIG. 1, FIG. 1 is a block diagram illustrating a Paillier decryption system in accordance with the present disclosure. As shown in FIG. 1, Paillier decryption system 100 includes multiple modules, including: transceiver module 102, data distribution module 110, modular exponentiation module 112, data merging module 114, first subtraction module 120, second subtraction module 122, first division module 130, second division module 132, first modular multiplication module 140, second modular multiplication module 142, modular subtraction module 150, third modular multiplication module 152, multiplication & addition module 154, modulo operation module 156 and parameter calculation module 104. Specifically, the transceiver module 102 receives the encrypted data that needs to be decrypted by the Paillier decryption algorithm from the outside and sends the unencrypted data obtained after the Paillier decryption to the outside. The transceiver module 102 can receive one encrypted data or multiple encrypted data from the outside at a time, and can have a built-in register for buffering the received multiple encrypted data. The transceiver module 102 is connected to the data distribution module 110, and the transceiver module 102 sends the encrypted data C (or called data C in encrypted state) to the data distribution module 110 one at a time. The transceiver module 102 may continuously send multiple encrypted data to the data distribution module 110, and two adjacent encrypted data in the sending order may share the same private key and public key or may have different private key or public key. The transceiver module 102 is also connected to the parameter calculation module 104. When the transceiver module 102 sends encrypted data C to the data distribution module 110, it also sends the private key and public key related to the encrypted data C to the parameter calculation module 104 for calculating the parameters related to the decryption computing process of the encrypted data C. These parameters are determined according to private key and public key. Parameter calculation module 104 is connected respectively to each of modular exponentiation module 112, first subtraction module 120, second subtraction module 122, first division module 130, second division module 132, first modular multiplication module 140, second modular multiplication module 142, modular subtraction module 150, third modular multiplication module 152, multiplication & addition module 154, and modular operation module 156, and is used for sending parameters required by respective computations of these modules to these modules. The data distribution module 110 distributes the received encrypted data C to multiple modular exponentiation engines included in the modular exponentiation module 112. The modular exponentiation module 112 includes a plurality of parallel modular exponentiation engines, numbered 1, 2 ... T1, T1+1, T1+2 ... T2. Among them, T1 and T2 are both positive integers, and T2 represents the total number of modular exponentiation engines included in the modular exponentiation module 112. A plurality of parallel modular exponentiation engines increase the speed of modular exponentiation operations through parallel processing, and then send their respective output results to the data merging module 114 for merging. The data merging module 114 has two outputs, which are connected to the first subtraction module 120 and the second subtraction module 122 respectively. From the beginning at the data merging module 114 to the end at the modular subtraction module 150, the computation process is divided into two paths. The first path starts from the data merging module 114 and passes through the first subtraction module 120, the first division module 130, the first modular multiplication module 140 in turn, and finally merges into the modular subtraction module 150; the second paths starts from the data merging module 114 and passes through the second subtraction module 122, the second division module 132, and the second modular multiplication module 142 in turn, and finally merges into the modular subtraction module 150. Starting from the modular subtraction module 150, it passes through the third modular multiplication module 152, the multiplication & addition module 154 and the modulo operation module 156 in turn, and finally outputs the unencrypted data M obtained after decrypting the encrypted data C, and the unencrypted data M is sent to the transceiver module 102. The following describes the operation of each module with reference to the Paillier decryption algorithm and FIG. 1. A typical Paillier decryption formula may be referred to the following formula (1) and formula (2).

$$M = L(C^{\lambda} \bmod N^2)/L(g^{\lambda} \bmod N^2) \bmod N, \ L(X) = (X-1)/N \quad (1)$$

$$N = PQ; \ \lambda = LCM(P-1, Q-1) \quad (2)$$

In formula (1), mod represents modulo operation; M represents unencrypted data; C represents encrypted data; L(X) represents a specific function, and its expression is also included in formula (1); (N, N²) is a public key representing N itself and the second power of N. The modulo in formula (1) has two categories which are N and the second power of N; (λ, g) is a private key. According to the Paillier encryption algorithm, public key N must be expressed as the product of two prime numbers that meet specific conditions, as shown in formula (2). In formula (2), P and Q are first prime and second prime, respectively, and the product of first prime P and second prime Q is public key N, and the length of first prime P and second prime Q are equal, that is, the bit widths under binarization are equal. According to the Paillier encryption algorithm, the private key A is determined according to first prime P and second prime Q, as shown in formula (2). P and Q are first prime and second prime respectively and correspond to P and Q in formula (2) respectively. LCM represents the function of finding the least common multiple. Therefore, through first prime P and second prime Q, there is a correspondence between public key N and private key A.

One may use the Chinese remainder theorem to divide the Paillier decryption formula of formula (1), and can get the first subitem as shown in the following formula (3) and the second subitem as shown in the following formula (4).

$$MP = LP(C^{P-1} \bmod P^2)/LP(g^{P-1} \bmod P^2) \bmod P, \ LP(X) = (X-1)/P \quad (3)$$

$$MQ = LQ(C^{Q-1} \bmod Q^2)/LQ(q^{Q-1} \bmod Q^2) \bmod Q, \ LQ(X) = (X-1)/Q \quad (4)$$

In formula (3), mod means modulo operation; MP means computation result of the first subitem; C means encrypted data; LP(X) means a specific function, and its expression is also included in formula (3); P is the first prime P that forms the public key N in the formula (2), so there are two kinds of modulus in formula (3) that are P and the second power of P; g is the private key. In formula (4), mod represents modulo operation; MQ represents computation result of the second subitem; C represents encrypted data; LQ(X) represents a specific function, and its expression is also included in formula (4); Q is the second prime Q that forms the public N in the formula (2), so there are two kinds of modulus in formula (4) that are Q and the second power of Q; g is the private key. It can be seen from formula (3) and formula (4) that the first subitem and second subitem obtained by dividing the Paillier decryption formula of formula (1) using the Chinese remainder theorem correspond to the first prime P and second prime Q that constitute the public key N, respectively. Moreover, with respect to the modulo operation of formula (1), the modulo of the modulo operation is N and the second power of N, in contrast, the modulo of the modulo operation of formula (3) is P and the second power of P, and the modulo of the modulo operation of formula (4) is Q and the second power of Q, which means that the maximum bit width of modulo is reduced from the bit width of the second power of N to the bit width of the second power of P or the bit width of the second power of Q. As mentioned above, Paillier encryption requires the bit width of P to be equal to the bit width of Q, which means that the maximum bit width of modulo of modulo operation is reduced by half, which greatly improves the speed of complex operations that are based on large integer bit widths, such as modular exponentiation operations, modular multiplication operations, and division operations, and similar operations with large integer bit widths. In addition, because the modulo of modulo operation is the largest of the second power of P and the second power of Q, therefore, in other words, the modulo of modular exponentiation operations related to the first subitem is the second power of the first prime P, and the modulo of modular exponentiation operations related to the second subitem is the second power of the second prime Q. This means that the maximum data bit width of the modulo operation related to the first subitem does not exceed twice the bit width of the first prime P, and the maximum data bit width of the modulo operation related to the second subitem does not exceed twice the bit width of the second prime Q. In addition, the computation process of the first subitem shown in formula (3) can be further expanded into the following formulas (5) to (9).

$$MP = \frac{C^{P-1} \bmod P^2 - 1}{P} \cdot HP \bmod P \quad (5)$$

$$HP = (-Q)^{-1} \bmod P = \quad (6)$$

$$\left(\frac{(1+PQ)^{P-1} \bmod P^2 - 1}{P}\right)^{-1} \bmod P = FP(P, Q)$$

$$RP1 = C^{P-1} \bmod P^2 \quad (7)$$

$$RP2 = RP1 - 1 = C^{P-1} \bmod P^2 - 1 \quad (8)$$

$$RP3 = RP2/P = (C^{P-1} \bmod P^2 - 1)/P \quad (9)$$

In formula (5), mod means modulo operation; MP means computation result of the first subitem; C means encrypted data; HP means intermediate parameters of the first subitem; P is the first prime P that constitutes public key N in formula (2). The calculation of intermediate parameters of the first subitem HP refers to formula (6). In formula (6), P is the first prime P that constitutes public key N in formula (2); Q is the second prime Q that constitutes public key N in formula (2);

$(-Q)^{-1}$ represents the modular inversion result, which means finding the corresponding inverse element. By substituting the expression for finding the inverse element into the formula (6) and expanding it, one can be see that the intermediate parameters of the first subitem HP can be expressed as a function FP determined according to first prime P and second prime Q. It can be seen from formula (5) and formula (6) that, the computation result of the first subitem MP is the result of modular multiplication operations with first prime P as modulo. One of the two parameters used for modular multiplication operations is the intermediate parameters of the first subitem HP shown in formula (6), and the other one of the two parameters can be obtained from the calculation by formula (7), formula (8) and formula (9) in turn. Specifically, formula (7) indicates that performing modular exponentiation operations to obtain a modular exponentiation result of the first subitem RP1, where C represents encrypted data, and P is the first prime P constituting the public key N in formula (2). Formula (8) indicates that subtracting the positive integer 1 from the modular exponentiation result of the first subitem RP1 calculated by the formula (7) to obtain the subtraction result of the first subitem RP2. Formula (9) indicates that performing division operation to the subtraction result of the first subitem RP2 calculated by the formula (8), where the divisor is first prime P, to obtain the division result of the first subitem RP3. Formula (5) indicates that the computation result of the first subitem MP is obtained by performing modular multiplication operations using the modulo P to the division result of the first subitem RP3 obtained by formula (9) and the intermediate parameters of the first subitem HP obtained by formula (6).

The computation process of the second subitem shown in formula (4) can be further expanded into the following formulas (10) to (14).

$$MQ = \frac{C^{Q-1} \bmod Q^2 - 1}{Q} \cdot HQ \bmod Q \qquad (10)$$

$$HQ = (-P)^{-1} \bmod Q = \left(\frac{(1+PQ)^{Q-1} \bmod Q^2 - 1}{Q}\right)^{-1} \bmod Q = FQ(P,Q) \qquad (11)$$

$$RQ1 = C^{Q-1} \bmod Q^2 \qquad (12)$$

$$RQ2 = RQ1 - 1 = C^{Q-1} \bmod Q^2 - 1 \qquad (13)$$

$$RQ3 = RQ2/Q = (C^{Q-1} \bmod Q^2 - 1)/Q \qquad (14)$$

In formula (10), mod means modulo operation; MQ means computation result of the second subitem; C means encrypted data; HQ means intermediate parameters of the second subitem; Q is the second prime Q that constitutes public key N in formula (2). The calculation of intermediate parameters of the second subitem HQ refers to formula (11). In formula (11), P is the first prime P that constitutes public key N in formula (2); Q is the second prime Q that constitutes public key N in formula (2); $(-P)^{-1}$ represents the modular inversion result, that is, the corresponding inverse element. By substituting the expression for finding the inverse element into the formula (11) and expanding it, one can be see that the intermediate parameters of the second subitem HQ can be expressed as a function FQ determined according to first prime P and second prime Q. It can be seen from formula (10) and formula (11) that, the computation result of the second subitem MQ is the result of modular multiplication operations with second prime Q as modulo. One of the two parameters used for modular multiplication operations is the intermediate parameters of the second subitem HQ shown in formula (11), and the other one of the two parameters can be obtained from the calculation by formula (12), formula (13) and formula (14) in turn. Specifically, formula (12) indicates that performing modular exponentiation operations to obtain a modular exponentiation result of the second subitem RQ1, where C represents encrypted data, and Q is the second prime Q constituting the public key N in formula (2). Formula (13) indicates that subtracting the positive integer 1 from the modular exponentiation result of the second subitem RQ1 calculated by the formula (12) to obtain the subtraction result of the second subitem RQ2. Formula (14) indicates that performing division operation to the subtraction result of the second subitem RQ2 calculated by the formula (13), where the divisor is second prime Q, to obtain the division result of the second subitem RQ3. Formula (10) indicates that the computation result of the second subitem MQ is obtained by performing modular multiplication operations using the modulo Q to the division result of the second subitem RQ3 obtained by formula (14) and the intermediate parameters of the second subitem HQ obtained by formula (11).

It should be understood that formula (5) to formula (9) correspond to the computation process of the first subitem shown in formula (3), and formula (10) to formula (14) correspond to the computation process of the second subitem shown in formula (4). The first subitem and second subitem are relative concepts, corresponding to the first prime P and the second prime Q that constitute the public key N, respectively. The first prime P and the second prime Q must satisfy the constraint condition that the bit width is equal and the product of the two is equal to modulo N. But "first prime" and "second prime" are only relative concepts. For example, assuming modulo N is 35, first prime P can be 5 (represented as 101 in binary) and second prime Q can be 7 (represented as 110 in binary), or first prime P can be 7 and second prime Q can be 5. Therefore, for any encrypted data C, given the public key N corresponding to the encrypted data C, the first prime P and the second prime Q in the relative sense can be determined according to the public key N, so as to expand the computation process of Paillier decryption of the encrypted data C into corresponding ones, which are the first subitem MP corresponding to the first prime P and the second subitem MQ corresponding to the second prime Q. Moreover, because first prime P and second prime Q must meet the constraint condition of equal bit width, this means that no matter how to specifically divide first subitem MP and second subitem MQ, the respective computation processes of first subitem MP and second subitem MQ must meet the constraint condition of equal bit width of large integers. As such, the modular exponentiation operations, the modular multiplication operations, and the division operations which have large integer bit widths and are involved in the respective calculation procedures of first subitem MP and second subitem MQ, will occupy similar computing resources and storage resources, making it suitable to utilize two paths to process separately to improve computation efficiency. In addition, it can be seen from formula (6) and formula (11) that for any encrypted data C, the public key N corresponding to the encrypted data C is given, and the first prime P and the second prime Q and the related division measure of first subitem MP and second subitem MQ are determined. Then the intermediate parameters of the first subitem HP and the intermediate parameters of the second subitem HQ can be determined by the functions FP and FQ, respectively. Because both the intermediate parameters of the first subitem HP and the intermediate parameters of the second subitem HQ have nothing to do with the specific encrypted data C, but only involve the public key N, they can be applied to multiple encrypted data sharing the same public key N. The following describes the correspondence between the multiple modules shown in FIG. 1 and the above formulas (5) to (14) with reference to Table 1.

TABLE 1

| computation process of the first subitem | formula (7) | formula (8) | formula (9) | formula (5) | formula (6) |
|---|---|---|---|---|---|
| modules that perform the computation process of the first subitem | modular exponentiation module 112 | first subtraction module 120 | first division module 130 | first modular multiplication module 140 | parameter calculation module 104 |
| computation process of the second subitem | formula (12) | formula (13) | formula (14) | formula (10) | formula (11) |
| modules that perform the computation process of the second subitem | modular exponentiation module 112 | second subtraction module 122 | second division module 132 | second modular multiplication module 142 | parameter calculation module 104 |

As shown in Table 1, for any encrypted data C, the transceiver module 102 sends the public key N related to the encrypted data C to the parameter calculation module 104, and the parameter calculation module 104 determines the first prime P and the second prime Q according to the public key N, and determines the intermediate parameters of the first subitem HP and the intermediate parameters of the second subitem HQ based on the first prime P and the second prime Q, and determines the first subitem MP corresponding to the first prime P and the second subitem MQ corresponding to the second prime Q according to the first prime P and the second prime Q. The parameter calculation module 104 sends the parameters involved in formula (7) and formula (12) to the modular exponentiation module 112, and the transceiver module 102 also sends the encrypted data C to the modular exponentiation module 112 through the data distribution module 110. The modular exponentiation module 112 includes a plurality of parallel modular exponentiation engines. In a manner of implementation, the modular exponentiation module 112 calculates the modular exponentiation operations of formula (7) and the modular exponentiation operations of formula (12) respectively. It can be seen from formula (7) and formula (12) that the power base is the encrypted data C, and the power exponent and modulo are determined according to the computation process of the first subitem MP and the second subitem MQ. As such, the modular exponentiation module 112 may include registers for caching related parameters. One can first according to the computation process of the first subitem MP and related parameters calculation formula (7), and then according to the computation process of the second subitem MQ and related parameters calculation formula (12). In another manner of implementation, because the bit widths of the first prime P and the second prime Q are the same, the numbers of parallel modular exponentiation engines that need to be used when performing modular exponentiation operations are also close, so one can assigned those modular exponentiation engines that are numbered 1, 2 . . . T1 to perform parallel processing on the computation process expressed by formula (7) of the first subitem MP, and assign the modular exponentiation engines that are numbered T1+1, T1+2 . . . T2 to perform parallel processing on the computation process expressed by formula (12) of the second subitem MQ. In other words, a total number T2 of multiple modular exponentiation engines can be divided into two parts, one part ha a total number T1 of modular exponentiation engines and is used to calculate formula (7), and the remaining modular exponentiation engine is used to calculate formula (12). The number of modular exponentiation engines in these two parts can be close, that is, T1 can be about half of T2, so that the computing resources allocated to formula (7) and formula (12) are similar. Alternatively, the number of modular exponentiation engines in these two parts can be determined based on the first prime P and the second prime Q. For example, referring to the ratio of the first prime P with respect to the second prime Q, one can allocate the corresponding number of modular exponentiation engines, and may allocate more modular exponentiation engines to a larger prime number. The modular exponentiation module 112 can calculate the modular exponentiation operations of formula (7) and the modular exponentiation operations of formula (12) respectively, and can also allocate a part of the modular exponentiation engines for the modular exponentiation operations of formula (7) while allocate another part of the modular exponentiation engines at the same time for the modular exponentiation operations of formula (12). The output of each modular exponentiation engine of the modular exponentiation module 112 is merged by the data merging module 114 and then sent to the corresponding next-level module for processing.

Referring to FIG. 1 and Table 1, relevant calculation of formula (7) in the computation process of the first subitem MP is performed by modular exponentiation module 112 to get the modular exponentiation result of the first subitem RP1; the modular exponentiation result of the first subitem RP1 is sent to the first subtraction module 120, relevant calculation of formula (8) in the computation process of the first subitem MP is performed by the first subtraction module 120 to obtain the subtraction result of the first subitem RP2; the subtraction result of the first subitem RP2 is sent to the first division module 130, and relevant calculation of formula (9) in the computation process of the first subitem MP is performed by the first division module 130 to obtain the division result of the first subitem RP3; the division result of the first subitem RP3 is sent to the first modular multiplication module 140, and the intermediate parameters of the first subitem HP obtained according to formula (6) are also sent to the first modular multiplication module 140 by the parameter calculation module 104, and relevant calculation of formula (5) in the computation process of the first subitem MP is performed by the first modular multiplication module 140 to obtain the computation result of the first subitem MP. In comparison with the first subitem MP, relevant calculation of formula (12) in the computation process of the second subitem MQ is performed by modular exponentiation module 112 to get the modular exponentiation result of the second subitem RQ1; the modular exponentiation result of the second subitem RQ1 is sent to the second subtraction module 122, relevant calculation of formula (13) in the computation process of the second subitem MQ is performed by the second subtraction module 122 to obtain the subtraction result of the second subitem RQ2; the subtraction result of the second subitem RQ2 is sent to the second division module 132, and relevant calculation of formula (14) in the computation process of the second subitem MQ is performed by the second division module 132 to obtain the division result of the second subitem RQ3; the division result of the second subitem RQ3 is sent to the second modular multiplication module 142, and the intermediate parameters of the second subitem HQ obtained according to formula (11) are also sent to the second modular multiplication module 142 by the parameter calculation module 104, and relevant calculation of formula (10) in the computation process of the second subitem MQ is performed by the second modular multiplication module 142 to obtain the computation result of the second subitem MQ. Therefore, the computation process of the first subitem MP corresponding to the first prime P follows the first path, starting from the data merging module 114 and passing through the first subtraction module 120, the first division module 130, and the first modular multiplication module 140 in turn and finally merging into the modular subtraction module 150; and the second prime The computation process of the second subitem MQ corresponding to Q follows the second path, starting from the data merging module 114, passing through the second subtraction module 122, the second division module 132, and the second modular multiplication module 142, and finally merges with the modular subtraction module 150. It should be understood that because the first prime P and the second prime Q are only relative concepts, the modules on the first path and the second path described above are also relative concepts, which means, the correspondence relationship between the formulas shown in Table 1 and the various modules of FIG. 1 is also a relative concept.

Referring to FIG. 1, the computation result of the first subitem MP output by the first modular multiplication module 140 and the computation result of the second subitem MQ output by the second modular multiplication module 142 are both sent to the modular subtraction module 150. The following describes the functions of modular subtraction module 150, third modular multiplication module 152, multiplication & addition module 154, and modulo operation module 156 with reference to the Paillier decryption algorithm. One can use the Chinese remainder theorem to divide the Paillier decryption formula as shown by formula (1) to obtain the first subitem MP as shown by formula (3) and the second subitem MQ as shown by formula (4), and the following computation process refers to formula (15) to formula (18).

$$\text{MODSUB} = (MP - MQ) \bmod P \qquad (15)$$

$$\text{MODK} = \text{MODSUB} \cdot Q^{-1} \bmod P \qquad (16)$$

$$\text{MODQ} = \text{MODK} \cdot Q + MQ \qquad (17)$$

$$M = \text{MODQ} \bmod N \qquad (18)$$

In formula (15), MODSUB represents the modular subtraction result; MP represents the computation result of the first subitem as shown in formula (3) and formula (5); MQ represents the computation result of the second subitem as shown in formula (4) and formula (10); P is the first prime P that constitutes the public key N in formula (2). In formula (16), MODK represents the third modular multiplication operations result; $Q^{-1}$ represents the modular inversion result, which is to find the corresponding inverse element. In formula (17), MODQ represents the result of multiplication and addition; MQ represents the computation result of the second subitem shown in formula (4) and formula (10). In formula (18), M represents unencrypted data.

Referring to FIG. 1, the modular subtraction operations of formula (15) are performed by the modular subtraction module 150. The modular subtraction module 150 obtains parameter P from the parameter calculation module 104, and obtains the computation result of the first subitem MP from the first modular multiplication module 140, and obtains the computation result of the second subitem MQ from the second modular multiplication module 142. The modular subtraction module 150 performs modular subtraction operations with reference to formula (15) to obtain the modular subtraction result MODSUB, and the modular subtraction result MODSUB is sent to the third modular multiplication module 152. The third modular multiplication module 152 performs modular multiplication operations with reference to formula (16), and obtains the parameter P and the modular inversion result of Q from the parameter calculation module 104, so as to obtain the third modular multiplication operations result MODK. The third modular multiplication operations result MODK is sent to the multiplication & addition module 154. The multiplication & addition module 154 performs multiplication and addition operations with reference to formula (17), and obtains the parameter Q from the parameter calculation module 104, while, the computation result of the second subitem MQ can follow the data flow through the modular subtraction module 150 and the third modular multiplication module 152 and pass to the multiplication & addition module 154, or, may be passed to the multiplication & addition module 154 by any suitable technical means. The result of multiplication and addition MODQ of the multiplication & addition module 154 is sent to the modulo operation module 156. The modulo operation module 156 obtains the parameter N from the parameter calculation module 104, performs a modulo operation on the result of multiplication and addition MODQ, and obtains the unencrypted data M that is obtained by performing Paillier decryption on the encrypted data C. The unencrypted data M is sent to the transceiver module 102.

Referring to FIG. 1, the modular subtraction module 150 is used to perform the modular subtraction operations of formula (15), in which the computation result of the first subitem MP minus the computation result of the second subitem MQ may appear negative. For this reason, the modular subtraction module 150 adopts the following methods to perform the modular subtraction operations. Specifically, there are three possibilities for the computation result of the first subitem MP minus the computation result of the second subitem MQ, which are: (a) less than −P, (b) between −P and 0; and (c) between 0 and P. Here, P is the first prime P that constitutes the public key N in formula (2). The modular subtraction module 150 makes two judgments, for the first judgement it judges whether the result is (c), if the result is (c), then outputs the subtraction result; if the result is not (c), then add the subtraction result to P and makes the second judgment to judge whether it is (c). If the second judgement is (c), then it outputs the subtraction result (this means that it is the case of (b) in the first judgement); however, if the second judgement is still not (c), then it continues to add P and outputs the subtraction result (this means it must be the case of (a) in the first judgment). After such processing, the subtraction result obtained is the modular subtraction result MODSUB, and the modular subtraction result MODSUB is passed to the next-level module.

Referring to FIG. 1, the first subtraction module 120 and the second subtraction module 122 are used to subtract the positive integer 1. The first subtraction module 120 and the second subtraction module 122 may each include a carry register (not shown), and the operation of subtracting the positive integer 1 is implemented by performing a bit-by-bit comparison with the value of the carry register in the following manner. Specifically, first one can set the value of the carry register to 1. The subtracted number is the object to be subtracted from the positive integer 1. One can shifted bit by bit from the binary lowest bit of the subtracted number toward the highest bit, and the binary current bit of the of the subtracted number is compared with the value of the carry register and the corresponding bit of the subtraction result is set according to the comparison result. When this iteration process ends, that is, when it moves to the highest bit of the subtracted number, it means that the setting for the subtraction result from the lowest bit to the highest bit has completed, so the iteration process ends and result of the subtraction operation is output. Comparing the binary current bit of the subtracted number with the value of the carry register and setting the corresponding bit of the subtraction result according to the comparison result, includes: if the binary current bit of the subtracted number is less than the value of the carry register, set the value of the carry register to 1 and the current bit of the subtraction result to 1; if the binary current bit of the subtracted number is equal to the value of the carry register, set the value of the carry register to 0 and the current bit of the subtraction result to 0; if the binary current bit of the subtracted number is greater than the value of the carry register, set the value of the carry register to 0 and the current bit of the subtraction result to 0. During the first round of the iterative process, the binary current bit of the subtracted number is the lowest binary bit of the subtracted number, and the value of the carry register is set to 1 at the beginning of the iterative process, and is then adjusted according to the above method, and the corresponding bit of the subtraction result is also the lowest bit of the subtraction result. After the end of the first round of the iterative process, one may shift from the lowest binary bit of the subtracted number to the lowest binary bit, and start the second round, and the value of the carry register is based on the comparison result during the first round after the first round ends. Therefore, by analogy, until the end of the iterative process, that is, until moving to the highest bit of the subtracted number, the operation of subtracting the positive integer 1 is completed.

Referring to FIG. 1, the first division module 130 and the second division module 132 are used for division operations, and the divisors are obtained from the parameter calculation module 104 respectively. The division operations can be implemented by any suitable circuit, logic element, algorithm or hardware, which is not specifically limited here.

Referring to FIG. 1, the third modular multiplication module 152 is used to perform modular multiplication operations with reference to formula (16). The third modular multiplication module 152 can be implemented by any suitable circuit, logic element, algorithm or hardware, which is not specifically limited here.

Referring to FIG. 1, the first modular multiplication module 140 and the second modular multiplication module 142 are used to perform modular multiplication operations with reference to formula (5) and formula (10), respectively. More details about the first modular multiplication module 140 and the second modular multiplication module 142 will be further described in the following detailed embodiments.

Referring to FIG. 1 and with reference to formulas (3) to (18), the computation process for Paillier decryption of encrypted data is divided into the first subitem corresponding to the first prime and the second subitem corresponding to the second prime, where the public key of the encrypted data is the product of the first prime and the second prime, and the bit width of the operations related to the first subitem is determined by the bit width of the first prime, and the bit width of the operations related to the second subitem is determined by the bit width of the second prime, thus greatly reducing the operational bit width and being beneficial to improve the speed of complex operations with large integer bit widths. In addition, the computation process of the first subitem goes through the first subtraction module, the first division module, and the first modular multiplication module in turn, and the computation process of the second subitem goes through the second subtraction module, the second division module, and the second modular multiplication module in turn, so that the first subitem and the second subitem can be processed in parallel to increase the overall computation speed. In addition, the parameter calculation module calculates relevant parameters for each encrypted data and sends each parameter to corresponding modules, thereby saving resources and time for repeated calculation of parameters and being beneficial to improve the overall calculation speed and saving power consumption. In addition, the secondary judgment mechanism of the modular subtraction module can avoid the possibility of negative numbers in the result of the computation result of the first subitem minus the computation result of the second subitem, so that the modular subtraction module can deal with any way of division of the first subitem and the second subitem, which is beneficial to improve the flow processing speed and system adaptability. In addition, one part of the modular exponentiation module can be used to process the modular exponentiation operations of the first subitem and the other part of the modular exponentiation module can be used to process the modular exponentiation operations of the second subitem in parallel, so that the modular exponentiation operations of the first subitem and the modular exponentiation operations of the second subitem can be processed in parallel, and then sent to the first subtraction module and the second subtraction module respectively to improve the overall computation speed. Therefore, the Paillier decryption system 100 shown in FIG. 1 can cope with various arithmetic operations with large integer bit widths involved in the Paillier algorithm and has good arithmetic performance and lower energy consumption.

Figure 2:
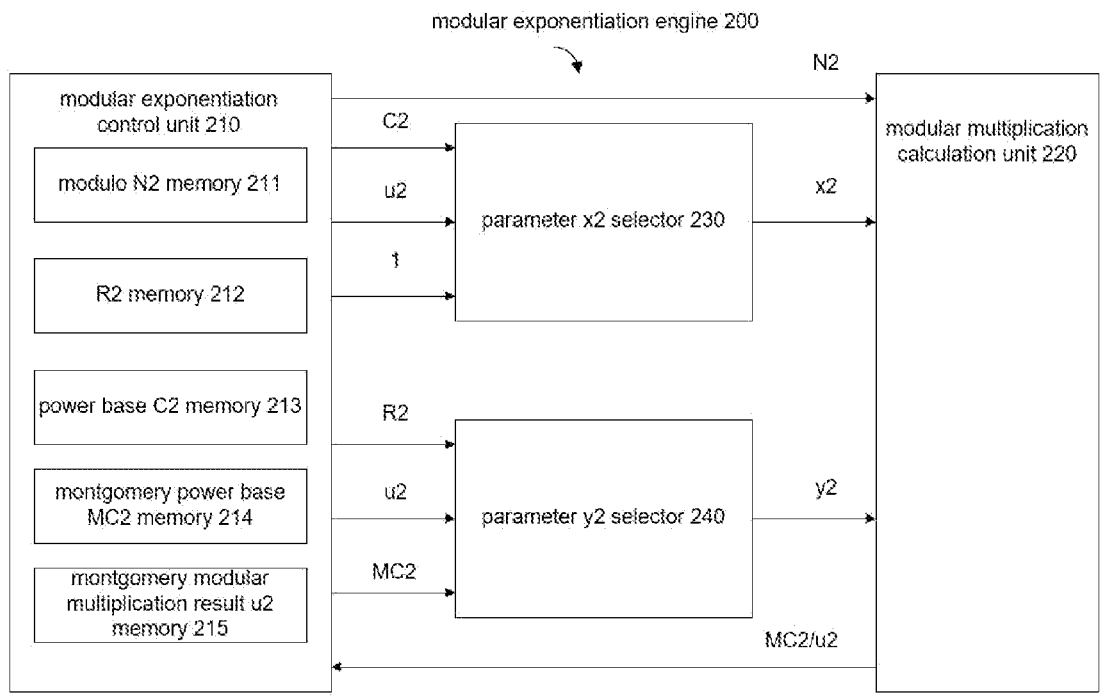
FIG. 2 is a block diagram illustrating a modular exponentiation engine of the modular exponentiation module of the Paillier decryption system in FIG. 1 in accordance with the present disclosure.

Referring to FIG. 2, FIG. 2 is a block diagram illustrating a modular exponentiation engine of the modular exponentiation module of the Paillier decryption system in FIG. 1 in accordance with the present disclosure. As shown in FIG. 2, the modular exponentiation engine 200 includes a modular exponentiation control unit 210, a modular multiplication calculation unit 220, a parameter x2 selector 230 and a parameter y2 selector 240. Among them, parameter x2 selector 230 provides parameter x2, parameter y2 selector 240 provides parameter y2, and modular exponentiation control unit 210 provides modulo N2 to modular multiplication calculation unit 220. Here, parameter x2 and parameter y2 respectively represent two parameters used for modular multiplication operations, and modulo N2 represents modulo for modulo operation. By using the parameter x2 selector 230 and parameter y2 selector 240 to select corresponding parameters x2 and y2 respectively, and by reusing the modular multiplication operations engine 220 and returning back the results of each modular multiplication operation to the modular exponentiation control unit 210, modular exponentiation operations can be realized. The modular exponentiation control unit 210 also includes modulo N2 memory 211 for storing modulo N2; R2 memory 212 for storing parameter R2, where parameter R2 is used for montgomerization; power base C2 memory 213 for storing power base C2, montgomery power base MC2 memory 214 for storing montgomery power base MC2, and montgomery modular multiplication result u2 memory 215 for storing montgomery modular multiplication result u2. The result of modular multiplication operation performed by modular multiplication calculation unit 220 can be used as montgomery modular multiplication result u2, which is returned back to modular exponentiation control unit 210 and then stored in montgomery modular multiplication result u2 memory 215 as montgomery modular multiplication result u2, or it can be used as montgomery power base MC2 to be stored as montgomery power base MC2 stored in montgomery power base MC2 memory 214.

Referring to FIG. 2, the parameter x2 selector 230 receives three parameters from the modular exponentiation control unit 210: the power base C2 stored in the power base C2 memory 213, the montgomery modular multiplication result u2 stored in the montgomery modular multiplication result u2 memory 215, and the positive integer 1. The parameter y2 selector 240 receives three parameters from the modular exponentiation control unit 210: the parameter R2 stored in R2 memory 212, the montgomery modular multiplication result u2 stored in montgomery modular multiplication result u2 memory 215, and the montgomery power base MC2 stored in montgomery power base MC2 memory 214. The modular exponentiation engine 200 allows the parameter x2 selector 230 and the parameter y2 selector 240 to selectively receive different inputs as the parameter x2 and the parameter y2, and inputs the parameter x2 and the parameter y2 to the modular multiplication calculation unit 220 for modular multiplication operations. Therefore, by setting parameter x2 selector 230 and parameter y2 selector 240 to receive and select different parameter combinations, respectively, it is beneficial to improve calculation efficiency and flexibility.

It should be understood that, by flexibly configuring the parameter x2 selector 230 and parameter y2 selector 240 of the modular exponentiation engine 200 to receive and select different parameter combinations, the modular exponentiation operations can be converted into multiple modular multiplication operations, so that the modular multiplication calculation unit 220 can be reused. In addition, a plurality of parallel modular exponentiation engines 200 can be used to perform efficient parallel calculations, thereby increasing the processing speed. In addition, one can selectively combine the parallel calculation provided by a plurality of parallel modular exponentiation engines 200 with the series calculation provided by montgomerization module, confusion calculation module, or montgomery reduction module, so as to realize various combinations of parallel operation and serial operation, which is beneficial to improve the operation efficiency of high-dimensional vectors and matrices in the dense state operation process, and also realizing a richer form of encrypted data operation in the dense state of homomorphic encryption. In addition, by dividing the encrypted data expression under the homomorphic encryption state into a combination of encrypted data multiplication and encrypted data addition, then the encrypted data multiplication and encrypted data addition are converted into combinations of modular exponentiation operations/modular multiplication operations, respectively, it is achieved that one can efficiently parallel process the computing requirements of homomorphic encryption encrypted data involved in federated learning application scenarios.

Figure 3:
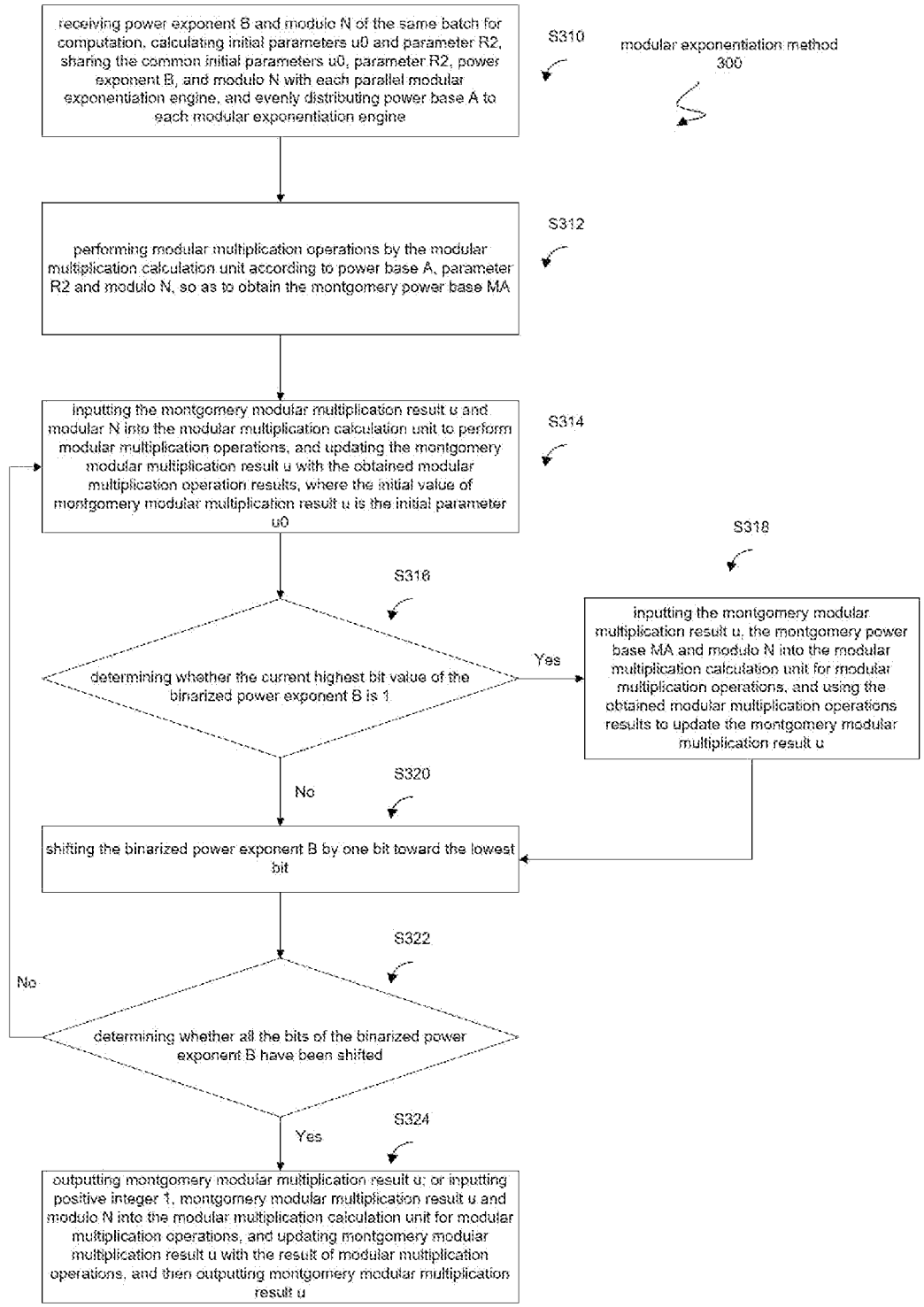
FIG. 3 is a flowchart illustrating the modular exponentiation engine shown in FIG. 2 performs modular exponentiation operations in accordance with the present disclosure.

Referring to FIG. 3, FIG. 3 is a flowchart illustrating the modular exponentiation engine shown in FIG. 2 performs modular exponentiation operations in accordance with the present disclosure. As shown in FIG. 3, the modular exponentiation method 300 includes the following steps. Related operations may refer to the following formula (19), formula (20) and formula (21).

$$A^B \bmod N \tag{19}$$

$$u0=2^n \bmod N \tag{20}$$

$$R2=2^{2n} \bmod N \tag{21}$$

Formula (19) represents the general formula of modular exponentiation operations. In formula (19), A represents power base; B represents power exponent; mod represents modulo operation; N represents modulo N. Formula (19) expresses modular exponentiation operations based on power base A, power exponent B and modulo N. It should be understood that in some exemplary embodiments, the modular exponentiation operations represented by formula (19) may have specific meanings. For example, the encrypted data multiplication operation in the homomorphic encryption state is the multiplication of unencrypted data and encrypted data and is equivalent to modular exponentiation operations which uses the power exponent B as the unencrypted data, the power base A as the encrypted data, and the secret key as the modulo N. Formula (20) and formula (21) are about the calculation methods of the shared parameters of the modular exponentiation operations of Formula (19). In formula (20) and formula (21), u0 represents the initial value of the montgomery modular multiplication result u in the iterative process of the square multiplication algorithm; R2 represents the parameter used to calculate the montgomery transformation of the power base A; mod represents modulo operation; N represents modulo N; n represents the actual bit width of modulo N. The following describes the steps of the method 300 of modular exponentiation operations in details with reference to formula (19), formula (20) and formula (21).

Step S310: receiving power exponent B and modulo N of the same batch for computation, calculating initial parameters u0 and parameter R2, sharing the common initial parameters u0, parameter R2, power exponent B, and modulo N with each parallel modular exponentiation engine, and evenly distributing power base A to each modular exponentiation engine.

Each parallel modular exponentiation engine refers to the structure of the modular exponentiation engine 200 shown in FIG. 2, that is, each includes a modular multiplication calculation unit for performing modular multiplication operations. In addition, each parallel modular exponentiation engine receives and selects different parameter combinations by flexibly configuring the parameter x2 selector and parameter y2 selector of the respective modular exponentiation engine, and can implement the related operations described below. In order to coordinately enable each parallel modular exponentiation engine for parallel calculation, it is necessary to share parameters for parallel processing in the same batch, including the initial parameter u0, parameter R2, power exponent B, and modulo N. To this end, it is necessary to share the common initial parameter u0, parameter R2, power exponent B, and modulo N to each parallel modular exponentiation engine. For the power base A, the power base A needs to be evenly distributed to each modular exponentiation engine. The calculation of the initial parameter u0 and the parameter R2 refer to the above formula (20) and formula (21) respectively. The modulo N corresponds to the modulo N2 stored in the modulo N2 memory 211 shown in FIG. 2.

Step S312: performing modular multiplication operations by the modular multiplication calculation unit according to power base A, parameter R2 and modulo N, so as to obtain the montgomery power base MA.

Please refer to the structure of the modular exponentiation engine 200 shown in FIG. 2. In step S312, the power base A is montgomery, and the power base A is selected as the parameter x2 (corresponding to the power base C2 stored in the power base C2 memory 213) and the selection parameter R2 is selected as the parameter y2 (corresponding to the parameter R2 stored in R2 memory 212), and the output result of modular multiplication operations is the montgomery power base MA (corresponding to the power base MC2 stored in montgomery power base MC2 memory 214).

Step S314: inputting the montgomery modular multiplication result u and modular N into the modular multiplication calculation unit to perform modular multiplication operations, and updating the montgomery modular multiplication result u with the obtained modular multiplication operation results, where the initial value of montgomery modular multiplication result u is the initial parameter u0.

Please refer to the structure of modular exponentiation engine 200 shown in FIG. 2. In step S314, it is to perform the first modular multiplication operations in the iterative process of the square multiplication algorithm, and select montgomery modular multiplication result u as the parameter x2 (corresponding to the stored montgomery modular multiplication result u2 in the montgomery modular multiplication result u2 memory 215) and select the montgomery power base MA as the parameter y2 (corresponding to the stored montgomery power base MC2 in the montgomery power base MC2 memory 214), the output result of modular multiplication operations is used to update the montgomery modular multiplication result u. When performing the first modular multiplication operations in the first round of the iterative process, the initial value u0 of the montgomery modular multiplication result u during the iteration of the square multiplication algorithm is used as the parameter x2 for calculation.

Step S316: determining whether the current highest bit value of the binarized power exponent B is 1, if it is 1, executing step S318; and if it is not 1, executing step S320.

It is judged whether to execute the second modular multiplication operation according to whether the current highest bit value of the binarized power exponent B is 1. If the current highest bit value of the power exponent B is 1, then it is to perform the second modular multiplication operation and execute step S318; if the current highest bit value of the power exponent B is not 1, then the second modular multiplication will not be performed and should execute step S320.

Step S318: inputting the montgomery modular multiplication result u, the montgomery power base MA and modulo N into the modular multiplication calculation unit for modular multiplication operations, and using the obtained modular multiplication operations results to update the montgomery modular multiplication result u.

Please refer to the structure of modular exponentiation engine 200 shown in FIG. 2. In step S318, it is to perform the second modular multiplication operations in the iterative process of the square multiplication algorithm, and select montgomery modular multiplication result u as the parameter x2 (corresponding to the stored montgomery modular multiplication result u2 in the montgomery modular multiplication result u2 memory 215) and select the montgomery power base MA as the parameter y2 (corresponding to the montgomery power base MC2 stored in the montgomery power base MC2 memory 214), uses the output result of modular multiplication operations to update the montgomery modular multiplication result u.

Step S320: shifting the binarized power exponent B by one bit toward the lowest bit.

In a possible implementation manner, the binarized power exponent B is shifted bit by bit from the highest bit of 1 (non-zero bit) to the lowest bit. In another possible implementation manner, one can start from the highest bit (which may be zero or non-zero bits) of the binarized power exponent B, and shift it bit by bit to the lowest bit.

Step S322: determining whether all the bits of the binarized power exponent B have been shifted, if all the bits have been shifted, then the modular exponentiation operations are finished and step S324 is executed; if there are still bits that have not been shifted, then step S314 is executed.

By iteratively executing steps S314 to S322, the binarized power exponent B is shifted bit by bit until all the bits of the binarized power exponent B have been shifted, that is, it has been shifted to the lowest bit. In addition, performing modular multiplication operations twice or once for each bit is judged according to its value being 1 or 0. When all bits have been shifted, it means that the iterative process ends and step S324 is executed, otherwise, it returns to step S314 to continue execution.

Step S324: outputting montgomery modular multiplication result u; or inputting positive integer 1, montgomery modular multiplication result u and modulo N into the modular multiplication calculation unit for modular multiplication operations, and updating montgomery modular multiplication result u with the result of modular multiplication operations, and then outputting montgomery modular multiplication result u.

In step S324, the modular exponentiation result in the montgomery space, which is the montgomery modular multiplication result u after step S322, can be directly output, or the montgomery modular multiplication result u can be de-montgomery, i.e., subject to montgomery reduction, and the montgomery reduction result can be output. To perform the montgomery reduction, one can select positive integer 1 as parameter x2 and select the montgomery modular multiplication result u as parameter y2 (corresponding to the stored montgomery modular multiplication result u2 in the montgomery modular multiplication result u2 memory 215) for modular multiplication operations. It should be understood that if a plurality of parallel modular exponentiation engines are used for parallel processing, after step S324 is executed and the modular exponentiation result is output, the end time of each parallel modular exponentiation engine may be inconsistent. After all of the modular exponentiation engines have finished their respective modular exponentiation operations, the calculation results output by each parallel modular exponentiation engine can be combined to obtain the complete modular exponentiation operations result. Then, it may be determined based on the operator mode whether there is a need to combine the parallel calculation provided by a plurality of parallel modular exponentiation engines with the series calculation provided by montgomerization module, confusion calculation module, or montgomery reduction module.

Therefore, by way of square multiplication and montgomery multiplication, by converting modular exponentiation operations into multiple modular multiplication operations, by shifting bit-by-bit from the highest bit 1 of the binarized power exponent e to the lowest bit, and at each bit, based on whether its value is 1 or 0, performing twice or a single modular multiplication operation(s) respectively, and by selective controlling the input parameter x and parameter y of each modular multiplication operation, and by updating the montgomery modular multiplication result u with the modular multiplication result, it is achieved that efficient modular exponentiation operations may be processed by multiple parallel modular exponentiation engines. Furthermore, modular exponentiation operations can be implemented based on square multiplication calculation in montgomery space and large number modular multiplication operations in montgomery space, such that the high parallel computing and pipeline characteristics of FPGA can be used to improve the overall computing power. In addition, it is possible to avoid direct modular operations on large integers, and replace them with multiplication, addition, and shift operations, thereby reducing computational complexity and improving computational efficiency. In addition, when utilizing implementations based on large number modular multiplication operations in montgomery space, one can configure bit width, pipeline stages and/or cycle times, such that in consideration of FPGA resources, device levels, pipeline stages, and main frequency factors, one can adjust the bit width, the number of pipeline stages, and/or the number of cycles to achieve the best performance improvement ratio.

Figure 4:
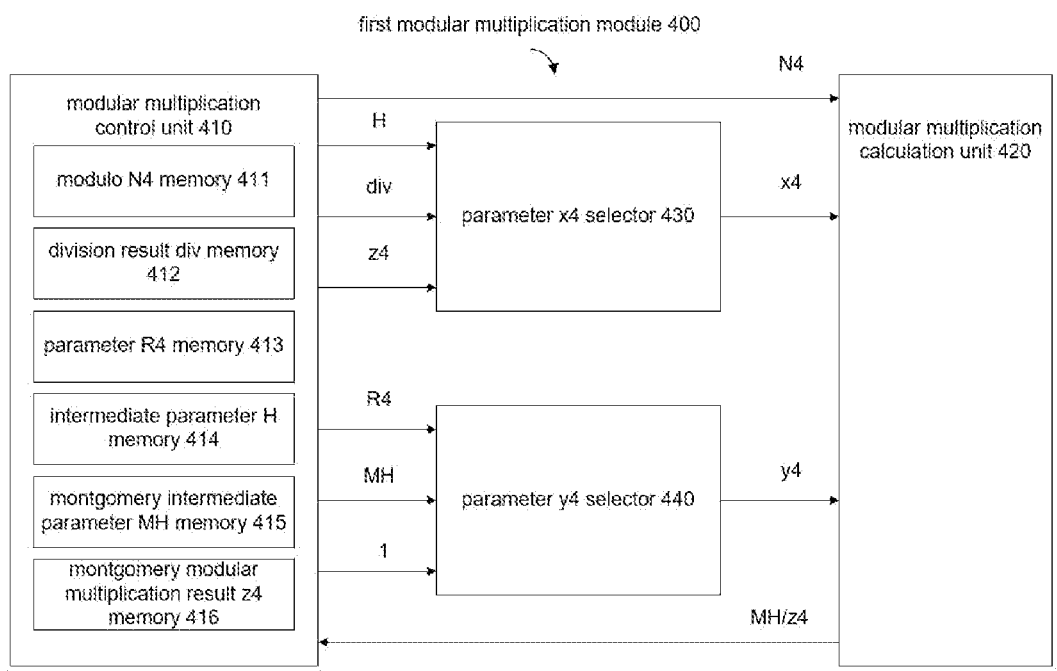
FIG. 4 is a block diagram illustrating the first modular multiplication module of the Paillier decryption system in FIG. 1 in accordance with the present disclosure.

Referring to FIG. 4, FIG. 4 is a block diagram illustrating the first modular multiplication module of the Paillier decryption system in FIG. 1 in accordance with the present disclosure. As shown in FIG. 4, the first modular multiplication module 400 includes a modular multiplication control unit 410, a modular multiplication calculation unit 420, a parameter x4 selector 430 and a parameter y4 selector 440. The parameter x4 selector 430 is used to select the parameter x4, the parameter y4 selector 440 is used to select the parameter y4, and the parameter x4 and the parameter y4 are input into the modular multiplication calculation unit 420 to be used as the two parameters for modular multiplication operations, and the modular multiplication control unit 410 also inputs the modulo N4 to the modular multiplication calculation unit 420 as a modulo for modular multiplication operations. The modular multiplication control unit 410 also includes modulo N4 memory 411 for storing modulo N4, division result div memory 412 for storing the division result div, parameter R4 memory 413 for storing parameter R4, and intermediate parameter H memory 414 for storing intermediate parameter H, the montgomery intermediate parameter MH memory 415 for storing the montgomery intermediate parameter MH, and the montgomery modular multiplication result z4 memory 416 for storing the montgomery modular multiplication result z4. The result obtained by modular multiplication operations performed by the modular multiplication calculation unit 420 may be stored in the montgomery intermediate parameter MH memory 415 as the montgomery intermediate parameter MH, or may be stored in the montgomery modular multiplication result z4 memory 416 as the montgomery modular multiplication result z4. The parameter x4 selector 430 is connected to the intermediate parameter H memory 414, the division result div memory 412 and the montgomery modular multiplication result z4, and selects one of the intermediate parameter H, the division result div, and the montgomery modular multiplication result z4 as the parameter x4. The parameter y4 selector 440 is connected to the parameter R4 memory 413 and the montgomery intermediate parameter MH, and selects one of the parameter R4, the montgomery parameter MH and the positive integer 1 as the parameter y4.

Referring to FIG. 1 and FIG. 4, the first modular multiplication module 400 is used to perform modular multiplication operations with reference to formula (5). The two parameters for modular multiplication operations are the division result of the first subitem RP3 obtained according to formula (9) and the intermediate parameters of the first subitem HP obtained according to formula (6). The first modular multiplication module 400 obtains the division result from the upper-level module, and obtains the intermediate parameters from the parameter calculation module (such as the parameter calculation module 104 shown in FIG. 1). Specifically, the parameters obtained by the first modular multiplication module 400 from the parameter calculation module include modulo N4, parameter R4, and intermediate parameter H. The first modular multiplication module 400 obtains from the upper-level module the division result div. It should be understood that the division result div corresponds to the division result of the first subitem RP3, and also corresponds to the specific encrypted data C. The modulo N4, parameter R4, and intermediate parameter H correspond to the first prime P of the public key N of the specific encrypted data C. The modulo N4 is the first prime P and also is the modulo for modular multiplication operations, the parameter R4 is the parameter used for montgomerization operations and is determined according to modulo N4, that is, first prime P. And the parameter H is the intermediate parameters of the first subitem HP. The parameter H, that is, the intermediate parameters of the first subitem HP, is calculated with reference to formula (6), which is determined by the first prime P and the second prime Q and the function FP.

Please continue to refer to FIG. 1 and FIG. 4, because the first prime P and the second prime Q are only relative concepts, and the first modular multiplication module 140 and the second modular multiplication module 142 shown in FIG. 1 are also relative concepts. Therefore, the first modular multiplication module 400 shown in FIG. 4 corresponds to the first modular multiplication module 140 shown in FIG. 1. The second modular multiplication module 142 shown in FIG. 1 can be understood as having the same structure as the first modular multiplication module 400 shown in FIG. 4, and one only needs to assign different meanings to the above-mentioned parameters. For example, the division result div corresponds to the division result of the second subitem RQ3 obtained according to formula (14), and also corresponds to the specific encrypted data C. The modulo N4, parameter R4, and intermediate parameter H correspond to the second prime Q of the public key N of the specific encrypted data C. The modulo N4 is the second prime Q and is also the modulo for modular multiplication operations. The parameter R4 is the parameter used for montgomerization operations and is determined according to modulo N4, that is, the second prime Q. The parameter H is the intermediate parameters of the second subitem HQ. The parameter H, that is, the intermediate parameters of the second subitem HQ, is calculated with reference to formula (11), which is determined by the first prime P and the second prime Q and the function FQ.

The structure of the first modular multiplication module 400 shown in FIG. 4 can be used for the first modular multiplication module 140 shown in FIG. 1 to perform the computation process of the first subitem, and can also be used for the second modular multiplication module 142 shown in FIG. 1 to perform the computation process of the second subitem. Specifically, the modular multiplication operations of formula (5) and formula (10) can be implemented through modular multiplication operations in montgomery space, including the following steps: (a) performing montgomerization operations to the intermediate parameter H, by inputting the intermediate parameter H as the parameter x4, the parameter R4 as the parameter y4 and the modulo N4 to the modular multiplication calculation unit 420 for modular multiplication operations, and storing the obtained result in the montgomery intermediate parameter MH memory 415; (b) performing montgomerization operations to the division result div, by inputting the division result div as parameter x4, parameter R4 as parameter y4 and modulo N4 to modular multiplication calculation unit 420 for modular multiplication operations, and storing the result in the montgomery modular multiplication result z4 memory 416; (c) performing modular multiplication operations in montgomery space, by inputting montgomery modular multiplication result z4 as parameter x4 and montgomery intermediate parameter MH as parameter y4 and modulo N4 into modular multiplication calculation unit 420 for modular multiplication operations, and storing the result in the montgomery modular multiplication result z4 memory 416; (d) performing montgomery reduction operations, by inputting montgomery modular multiplication result z4 as parameter x4 and positive integer 1 as parameter y4 and modulo N4 into the modular multiplication calculation unit 420 for modular multiplication operations, and storing the result in the montgomery Modular multiplication result z4 memory 416. For each received new division result div and corresponding modulo N4, parameter R4 and intermediate parameter H, the first modular multiplication module 400 performs the above steps (a) to (d) in sequence, and finally stores in the montgomery modular multiplication result z4 memory 416 the result of modular multiplication operations. When the division result div corresponds to the division result of the first subitem RP3 shown in formula (9), the final output is the computation result of the first subitem MP shown in formula (5); when the division result div corresponds to the division result of the second subitem RQ3 as shown in formula (14), the final output is the computation result of the second subitem MQ shown in formula (10). Therefore, the first modular multiplication module 400 shown in FIG. 4 can use first prime P or second prime Q as modulo, thereby greatly reducing the operational bit width and being beneficial to improve the speed of complex operations with large integer bit widths.

Figure 5:
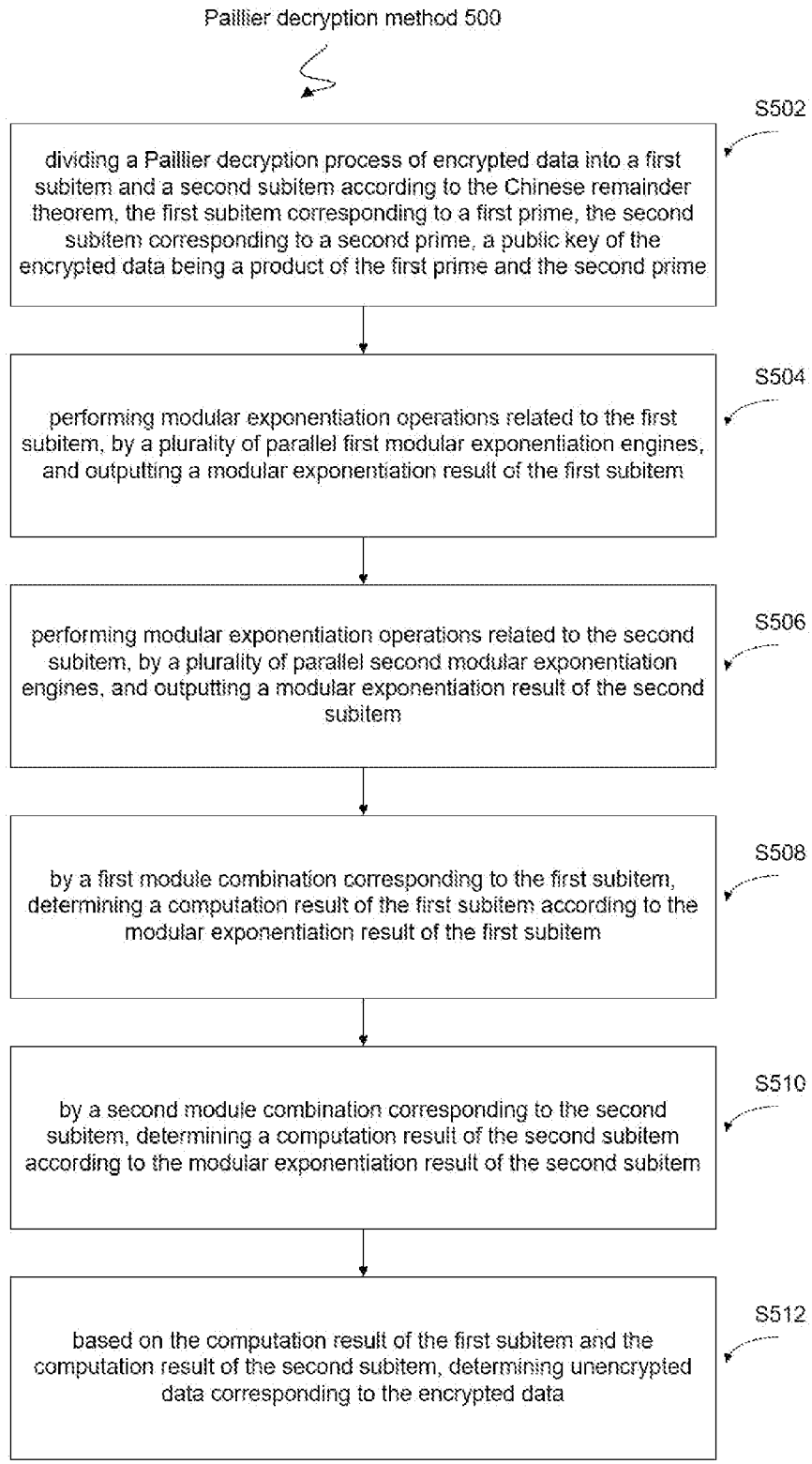
FIG. 5 is a flowchart illustrating a method for Paillier decrypting in accordance with the present disclosure.

Referring to FIG. 5, FIG. 5 is a flowchart illustrating a method for Paillier decrypting in accordance with the present disclosure. As shown in FIG. 5, the Paillier decryption method 500 includes the following steps.

Step S502: dividing a Paillier decryption process of encrypted data into a first subitem and a second subitem according to the Chinese remainder theorem, the first subitem corresponding to a first prime, the second subitem corresponding to a second prime, a public key of the encrypted data being a product of the first prime and the second prime.

Referring to formula (3) and formula (4), one can use the Chinese remainder theorem to divide the Paillier decryption formula of formula (1) to obtain the first subitem and second subitem respectively corresponding to the first prime P and second prime Q that constitute the public key N.

Step S504: performing modular exponentiation operations related to the first subitem, by a plurality of parallel first modular exponentiation engines, and outputting a modular exponentiation result of the first subitem.

For the structure of each first modular exponentiation engine of the multiple parallel first modular exponentiation engines, refer to the modular exponentiation engine shown in FIG. 2, and refer to FIG. 3 for the method of modular exponentiation operations.

Step S506: performing modular exponentiation operations related to the second subitem, by a plurality of parallel second modular exponentiation engines, and outputting a modular exponentiation result of the second subitem.

For the structure of each second modular exponentiation engine of the multiple parallel second modular exponentiation engines, refer to the modular exponentiation engine shown in FIG. 2, and refer to FIG. 3 for the method of modular exponentiation operations.

Step S508: by a first module combination corresponding to the first subitem, determining a computation result of the first subitem according to the modular exponentiation result of the first subitem.

The computation process of the first subitem refers to formula (5) to formula (9).

Step S510: by a second module combination corresponding to the second subitem, determining a computation result of the second subitem according to the modular exponentiation result of the second subitem.

The computation process of the second subitem refers to formula (10) to formula (14).

Step S512: based on the computation result of the first subitem and the computation result of the second subitem, determining unencrypted data corresponding to the encrypted data.

The process of obtaining unencrypted data refers to formula (15) to formula (18).

The detailed embodiments provided in the present disclosure can be implemented by any one or a combination of hardware, software, firmware, or solid-state logic circuits, and can be implemented in combination with signal processing, control, and/or dedicated circuits. The equipment(s) or device(s) provided in the detailed embodiments of the present disclosure may include one or more processors (a microprocessor, a controller, a digital signal processor (DSP), an application specific integrated circuit (ASIC), a field programmable gate array (FPGA) and so on), and these processors process various computer-executable instructions to control the operations of the equipment(s) or device(s). The equipment(s) or device(s) provided in the detailed embodiments of the present disclosure may include a system bus or a data transmission system that couples various components together. The system bus may include any one of different bus structures or a combination of different bus structures, such as a memory bus or a memory controller, a peripheral bus, a universal serial bus, and/or a process or a local bus using any of a variety of bus architectures. The equipment(s) or device(s) provided in the detailed embodiments of the present disclosure may be provided separately, may also be a part of the system, or may be a part of other equipment or devices.

The detailed embodiments provided by the present disclosure may include a computer-readable storage medium or a combination with a computer-readable storage medium, such as one or more storage devices capable of providing non-transitory data storage. The computer-readable storage medium/storage device may be configured to store data, programmers and/or instructions, which when executed by the processor of the equipment(s) or device(s) provided in the present disclosure, would allow the equipment(s) or device(s) to implement related operations. The computer-readable storage medium/storage device may include one or more of the following characteristics: volatile, nonvolatile, dynamic, static, read/write, read-only, random access, sequential access, location addressability, file addressability and content addressability. In one or more exemplary embodiments, the computer-readable storage medium/storage device may be integrated into the equipment(s) or device(s) provided in the detailed embodiments of the present disclosure or belong to a public system. The computer-readable storage media/storage devices can include optical storage devices, semiconductor storage devices and/or magnetic storage devices, etc., and can also include random access memory (RAM), flash memory, read-only memory (ROM), erasable and programmable read-only memory (EPROM), electrically erasable programmable read-only memory (EEPROM), registers, hard disk, removable disk, recordable and/or rewritable compact disc (CD), digital versatile disc (DVD), large capacity storage medium device or any other form of suitable storage medium.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A Paillier decryption system implemented by an integrated circuit, comprising:
a modular exponentiation module, configured for performing modular exponentiation operations related to a first subitem to output a modular exponentiation result of the first subitem and for performing modular exponentiation operations related to a second subitem to output a modular exponentiation result of the second subitem, wherein, a Paillier decryption process of encrypted data being divided into a first subitem and a second subitem according to the Chinese remainder theorem, the first subitem corresponding to a first prime, the second subitem corresponding to a second prime, a public key of the encrypted data being a product of the first prime and the second prime, a bit width of the first prime being the same as a bit width of the second prime;
a first subtraction module for performing subtraction operation by subtracting one on the modular exponentiation result of the first subitem to output a subtraction result of the first subitem;
a first division module for performing division operation using the first prime as the divisor on the subtraction result of the first subitem to output a division result of the first subitem;
a first modular multiplication module for performing modular multiplication operations on the division result of the first subitem to output a computation result of the first subitem;
a second subtraction module for performing subtraction operation by subtracting one on the modular exponentiation result of the second subitem to output a subtraction result of the second subitem;
a second division module for performing division operation using the second prime as the divisor on the subtraction result of the second subitem to output a division result of the second subitem; and
a second modular multiplication module for performing modular multiplication operations on the division result of the second subitem to output a computation result of the second subitem,
wherein, the first modular multiplication module using the first prime as the modulo for performing modular multiplication operations, the second modular multiplication module using the second prime as the modulo for performing modular multiplication operations, the computation result of the first subitem and the computation result of the second subitem being used to determine unencrypted data corresponding to the encrypted data, and
wherein the encrypted data is cross-industry and cross-domain application data in an Internet domain controlled by different computing entities that abide by data protection and user privacy laws.

2. The system according to claim 1, the modulo of modular exponentiation operations related to the first subitem is the second power of the first prime, and the modulo of modular exponentiation operations related to the second subitem is the second power of the second prime.

3. The system according to claim 1, further comprising:
a parameter calculation module, configured for calculating the first prime and the second prime according to a public key of the encrypted data, calculating intermediate parameters of the first subitem and intermediate parameters of the second subitem respectively according to the first prime and the second prime, sending the intermediate parameters of the first subitem to the first modular multiplication module, and sending the intermediate parameters of the second subitem to the second modular multiplication module.

4. The system according to claim 3, the first modular multiplication module performs modular multiplication operations according to the division result of the first subitem and the intermediate parameters of the first subitem, and the second modular multiplication module performs modular multiplication operations according to the division result of the second subitem and the intermediate parameters of the second subitem.

5. The system according to claim 1, the modular exponentiation module includes a plurality of parallel modular exponentiation engines, wherein, the modular exponentiation module is configured for performing modular exponentiation operations related to the first subitem to output the modular exponentiation result of the first subitem and for performing modular exponentiation operations related to the second subitem to output the modular exponentiation result of the second subitem, comprises:

a first part of the plurality of parallel modular exponentiation engines is used to implement modular exponentiation operations related to the first subitem to output the modular exponentiation result of the first subitem, a second part of the plurality of parallel modular exponentiation engines is used to implement modular exponentiation operations related to the second subitem to output the modular exponentiation result of the second subitem, a ratio of the number of modular exponentiation engines of the first part with respect to the number of modular exponentiation engines of the second part is determined according to a ratio of the first prime with respect to the second prime.

6. The system according to claim 1, further comprising:
a modular subtraction module for performing modular multiplication operations on a subtraction result to obtain a modular subtraction result, the subtraction result being the difference of the computation result of the first subitem minus the computation result of the second subitem.

7. The system according to claim 6, the modular subtraction module for performing modular multiplication operations on the subtraction result to obtain the modular subtraction result, comprises:
when the subtraction result is greater than zero but less than the first prime, the modular subtraction result is the subtraction result;
when the subtraction result is less than zero and a sum of the subtraction result plus the first prime is greater than zero, the modular subtraction result is the sum of the subtraction result plus the first prime;
when the subtraction result is less than zero and the sum of the subtraction result plus the first prime is less than zero, the modular subtraction result is the sum of the subtraction result plus twice of the first prime.

8. The system according to claim 6, further comprising:
a third modular multiplication module for performing modular multiplication operations based on the modular subtraction result and a modular inversion result of the second prime.

9. An integrated circuit (IC), applicable to Paillier decrypting, comprising:
a modular exponentiation module, configured for performing modular exponentiation operations related to a first subitem to output a modular exponentiation result of the first subitem and for performing modular exponentiation operations related to a second subitem to output a modular exponentiation result of the second subitem, wherein, a Paillier decryption process of encrypted data being divided into a first subitem and a second subitem according to the Chinese remainder theorem, the first subitem corresponding to a first prime, the second subitem corresponding to a second prime, a public key of the encrypted data being a product of the first prime and the second prime, a bit width of the first prime being the same as a bit width of the second prime;
a first module combination corresponding to the first subitem, the first module combination being configured for determining a computation result of the first subitem according to the modular exponentiation result of the first subitem; and
a second module combination corresponding to the second subitem, the second module combination being configured for determining a computation result of the second subitem according to the modular exponentiation result of the second subitem, wherein, the computation result of the first subitem and the computation result of the second subitem are used to determine unencrypted data corresponding to the encrypted data, wherein, the first module combination being configured for determining the computation result of the first subitem according to the modular exponentiation result of the first subitem, comprises: by way of the first module combination, performing subtraction operation by subtracting one on the modular exponentiation result of the first subitem to obtain a subtraction result of the first subitem, performing division operation using the first prime as the divisor on the subtraction result of the first subitem to obtain a division result of the first subitem, and performing modular multiplication operations on the division result of the first subitem to obtain the computation result of the first subitem, wherein, the second module combination being configured for determining the computation result of the second subitem according to the modular exponentiation result of the second subitem, comprises: by way of the second module combination, performing subtraction operation by subtracting one on the modular exponentiation result of the second subitem to obtain a subtraction result of the second subitem, performing division operation using the second prime as the divisor on the subtraction result of the second subitem to obtain a division result of the second subitem, and performing modular multiplication operations on the division result of the second subitem to obtain the computation result of the second subitem, and wherein the encrypted data is cross-industry and cross-domain application data in an Internet domain controlled by different computing entities that abide by data protection and user privacy laws.

10. The IC according to claim 9, further comprising:
a modular subtraction module for performing modular multiplication operations on a subtraction result to obtain a modular subtraction result, the subtraction result being the difference of the computation result of the first subitem minus the computation result of the second subitem.

11. The IC according to claim 10, the modular subtraction module for performing modular multiplication operations on the subtraction result to obtain the modular subtraction result, comprises:
when the subtraction result is greater than zero but less than the first prime, the modular subtraction result is the subtraction result;
when the subtraction result is less than zero and a sum of the subtraction result plus the first prime is greater than zero, the modular subtraction result is the sum of the subtraction result plus the first prime;
when the subtraction result is less than zero and the sum of the subtraction result plus the first prime is less than zero, the modular subtraction result is the sum of the subtraction result plus twice of the first prime.

12. The IC according to claim 9, the modular exponentiation module includes a plurality of parallel modular exponentiation engines, wherein, the modular exponentiation module is configured for performing modular exponentiation operations related to the first subitem to output the modular exponentiation result of the first subitem and for performing modular exponentiation operations related to the second subitem to output the modular exponentiation result of the second subitem, comprises:
- a first part of the plurality of parallel modular exponentiation engines is used to implement modular exponentiation operations related to the first subitem to output the modular exponentiation result of the first subitem,
- a second part of the plurality of parallel modular exponentiation engines is used to implement modular exponentiation operations related to the second subitem to output the modular exponentiation result of the second subitem.

13. The IC according to claim 9, further comprising:
- a parameter calculation module, configured for calculating the first prime and the second prime according to a public key of the encrypted data, calculating intermediate parameters of the first subitem and intermediate parameters of the second subitem respectively according to the first prime and the second prime, sending the intermediate parameters of the first subitem to the first module combination, and sending the intermediate parameters of the second subitem to the second module combination.

14. The IC according to claim 9, the modulo of modular exponentiation operations related to the first subitem is the second power of the first prime, and the modulo of modular exponentiation operations related to the second subitem is the second power of the second prime.

15. A method for Paillier decrypting implemented by an integrated circuit, comprising:
- dividing a Paillier decryption process of encrypted data into a first subitem and a second subitem according to the Chinese remainder theorem, the first subitem corresponding to a first prime, the second subitem corresponding to a second prime, a public key of the encrypted data being a product of the first prime and the second prime;
- performing modular exponentiation operations related to the first subitem, by a plurality of parallel first modular exponentiation engines, and outputting a modular exponentiation result of the first subitem;
- performing modular exponentiation operations related to the second subitem, by a plurality of parallel second modular exponentiation engines, and outputting a modular exponentiation result of the second subitem;
- by a first module combination corresponding to the first subitem, determining a computation result of the first subitem according to the modular exponentiation result of the first subitem;
- by a second module combination corresponding to the second subitem, determining a computation result of the second subitem according to the modular exponentiation result of the second subitem; and
- based on the computation result of the first subitem and the computation result of the second subitem, determining unencrypted data corresponding to the encrypted data,
- wherein, determining the computation result of the first subitem according to the modular exponentiation result of the first subitem, comprises: performing subtraction operation by subtracting one on the modular exponentiation result of the first subitem to obtain a subtraction result of the first subitem, performing division operation using the first prime as the divisor on the subtraction result of the first subitem to obtain a division result of the first subitem, and performing modular multiplication operations on the division result of the first subitem to obtain the computation result of the first subitem,
- wherein, determining the computation result of the second subitem according to the modular exponentiation result of the second subitem, comprises: performing subtraction operation by subtracting one on the modular exponentiation result of the second subitem to obtain a subtraction result of the second subitem, performing division operation using the second prime as the divisor on the subtraction result of the second subitem to obtain a division result of the second subitem, and performing modular multiplication operations on the division result of the second subitem to obtain the computation result of the second subitem, and
- wherein the encrypted data is cross-industry and cross-domain application data in an Internet domain controlled by different computing entities that abide by data protection and user privacy laws.

16. The method according to claim 15, further comprising:
- performing modular multiplication operations on a subtraction result to obtain a modular subtraction result, the subtraction result being the difference of the computation result of the first subitem minus the computation result of the second subitem.

17. The method according to claim 16, performing modular multiplication operations on the subtraction result to obtain the modular subtraction result, comprises:
- when the subtraction result is greater than zero but less than the first prime, the modular subtraction result is the subtraction result;
- when the subtraction result is less than zero and a sum of the subtraction result plus the first prime is greater than zero, the modular subtraction result is the sum of the subtraction result plus the first prime;
- when the subtraction result is less than zero and the sum of the subtraction result plus the first prime is less than zero, the modular subtraction result is the sum of the subtraction result plus twice of the first prime.

18. The method according to claim 16, further comprising:
- performing modular multiplication operations based on the modular subtraction result and a modular inversion result of the second prime.

19. The method according to claim 15, the modulo of modular exponentiation operations related to the first subitem is the second power of the first prime, and the modulo of modular exponentiation operations related to the second subitem is the second power of the second prime.

20. The method according to claim 15, further comprising:
- calculating the first prime and the second prime according to a public key of the encrypted data, calculating intermediate parameters of the first subitem and intermediate parameters of the second subitem respectively according to the first prime and the second prime, sending the intermediate parameters of the first subitem to the first module combination, and sending the intermediate parameters of the second subitem to the second module combination.

* * * * *